(12) United States Patent
Suzuki et al.

(10) Patent No.: US 11,718,208 B2
(45) Date of Patent: Aug. 8, 2023

(54) VEHICLE SEAT MOUNTING BRACKET FOR ENERGY ATTENUATING MEMBER

(71) Applicant: Honda Motor Co., Ltd., Tokyo (JP)

(72) Inventors: Junichi Suzuki, Royal Oak, MI (US); Fernando M. Rosero, Rochester Hills, MI (US); Eric D. Daume, Plain City, OH (US); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 17/471,838

(22) Filed: Sep. 10, 2021

(65) Prior Publication Data

US 2023/0082073 A1  Mar. 16, 2023

(51) Int. Cl.
*B60N 2/427* (2006.01)
*B60N 2/42* (2006.01)

(52) U.S. Cl.
CPC ....... *B60N 2/42709* (2013.01); *B60N 2/4228* (2013.01); *B60N 2/42736* (2013.01)

(58) Field of Classification Search
CPC .............. B60N 2/42709; B60N 2/4228; B60N 2/42736
See application file for complete search history.

(56) References Cited

U.S. PATENT DOCUMENTS

| | | | |
|---|---|---|---|
| 5,498,052 A * | 3/1996 | Severini | B60N 2/305 297/14 |
| 8,602,492 B2 | 12/2013 | Nakaya et al. | |
| 9,616,778 B1 * | 4/2017 | Bates | |
| 10,532,668 B2 | 1/2020 | Park et al. | |
| 2022/0314847 A1 * | 10/2022 | Howard, Jr. | B60N 2/42709 |

FOREIGN PATENT DOCUMENTS

| | | |
|---|---|---|
| CN | 105416100 | 3/2016 |
| CN | 107020980 | 8/2017 |
| CN | 211335669 | 8/2020 |
| DE | 102015211334 | 12/2016 |
| FR | 2848929 | 4/2006 |
| JP | 3755414 | 3/2006 |
| JP | 2007168457 | 7/2007 |

* cited by examiner

*Primary Examiner* — Anthony D Barfield
(74) *Attorney, Agent, or Firm* — Mark E. Duell; Rankin Hill & Clark LLP

(57) ABSTRACT

A vehicle assembly includes a vehicle body including a frame backing member, and a vehicle seat including a seat back having a seat back frame. An energy attenuating member is positioned in a space between the frame backing member and the seat back frame in a front-rear direction of the vehicle assembly. The energy attenuating member is connected to the frame backing member. A mounting bracket is connected to the energy attenuating member. A connection support portion releasably connects the mounting bracket to an upper portion of the seat back frame in a height direction of the vehicle assembly.

20 Claims, 3 Drawing Sheets

VEHICLE SEAT MOUNTING BRACKET FOR ENERGY ATTENUATING MEMBER

BACKGROUND

Known vehicles include structural features designed to collapse and absorb kinetic energy in a collision to safeguard occupants. In order to absorb sufficient kinetic energy in a collision, such collapsing features occupy space within a vehicle body and reduce an interior space of the vehicle available for occupants. Accordingly, there is a desire for vehicle assemblies having features that are compact during nominal operation of the vehicle, and configured to collapse during a collision to absorb kinetic energy in a collision and safeguard vehicle occupants.

BRIEF DESCRIPTION

According to one aspect, a vehicle assembly comprises a vehicle body including a frame backing member, and a vehicle seat including a seat back having a seat back frame. An energy attenuating member is positioned in a space between the frame backing member and the seat back frame in a front-rear direction of the vehicle assembly. The energy attenuating member is connected to the frame backing member. A mounting bracket is connected to the energy attenuating member. A connection support portion releasably connects the mounting bracket to an upper portion of the seat back frame in a height direction of the vehicle assembly.

According to another aspect, a vehicle assembly comprises a vehicle body including a frame backing member, and a seat having a seat back with a seat back frame. An upper portion of the seat back frame is aligned with the frame backing member relative to a height direction of the vehicle assembly. An energy attenuating member is positioned in a space between the frame backing member and the seat back frame and is connected to the frame backing member. During a crash event the energy attenuating member is configured to collapse between the seat back frame and the frame backing member to absorb kinetic energy in the vehicle seat when the seat back is driven toward the frame backing member. A mounting bracket includes a first mounting part and a second mounting part extended from the first mounting part. The second mounting part is connected to the energy attenuating member. A connection support portion releasably connects the first mounting part of the mounting bracket to the upper portion of the seat back frame.

According to another aspect, a vehicle assembly comprises a vehicle body including a frame backing member, and a vehicle seat including a seat back having a seat back frame. A first energy attenuating member and a second energy attenuating member are each positioned in a space between the frame backing member and the seat back frame in a front-rear direction of the vehicle assembly. The first energy attenuating member and a second energy attenuating member are each connected to the frame backing member. A mounting bracket is connected to the first energy attenuating member and the second energy attenuating member. A connection support portion releasably connects the mounting bracket to an upper portion of the seat back frame in a height direction of the vehicle assembly. The connection support portion includes a latch mechanism having a first latch component provided on the mounting bracket between the first energy attenuating member and the second energy attenuating member and a second latch component for connection with the first latch component provided on the seat back frame.

DETAILED DESCRIPTION

Figure 1:
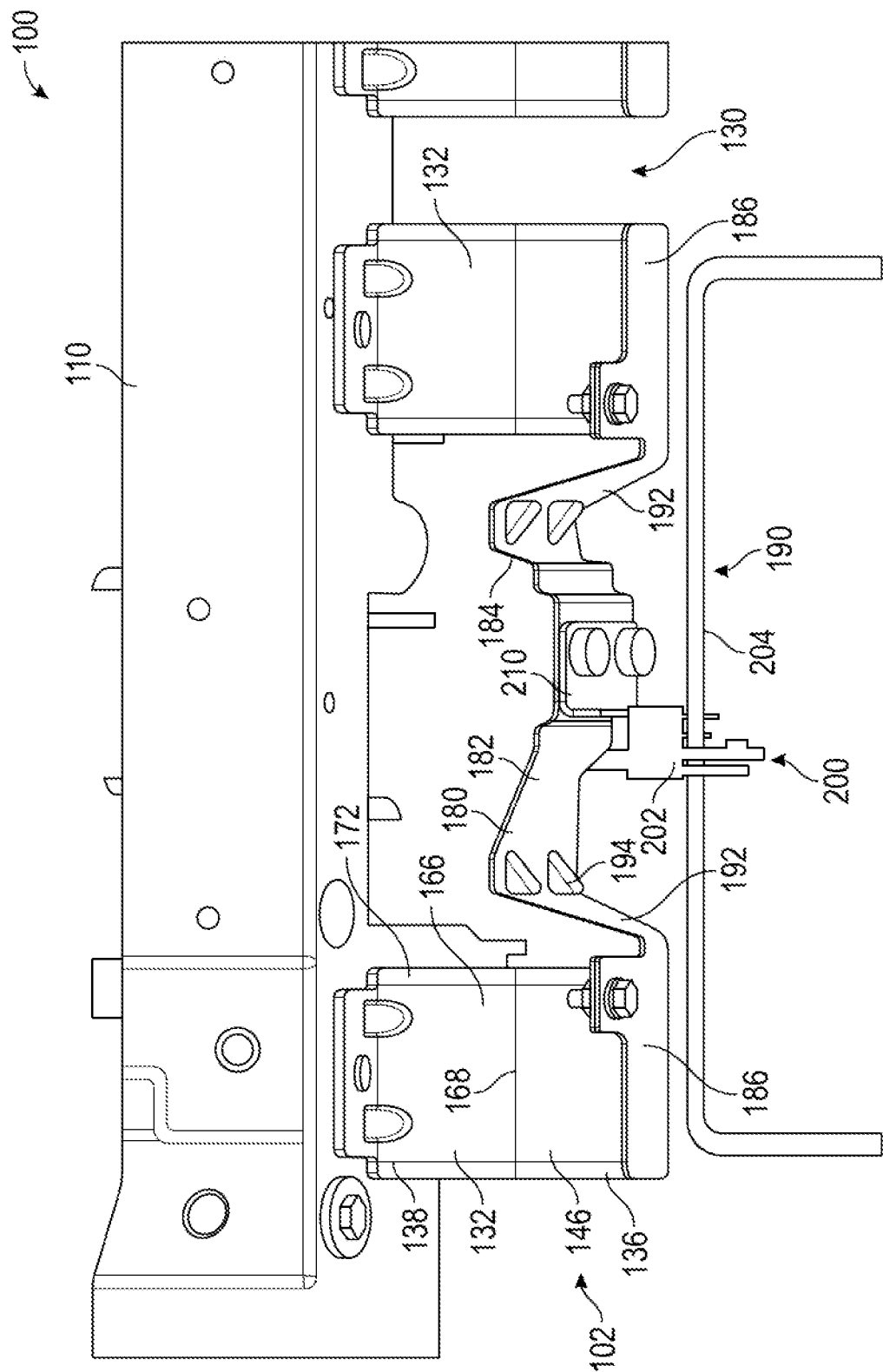
FIG. 1 is partial top plan view of a vehicle assembly according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-3 partially depict a vehicle assembly 100 according to the present disclosure. The vehicle assembly 100 generally includes a vehicle body 102 and a vehicle seat 104 mounted to the vehicle body. In this example embodiment, the term "vehicle body" is used generically, and should be interpreted to include structural components of the vehicle assembly 100, such as a frame assembly. The vehicle body 102 extends in a front-rear (longitudinal) direction, a left-right (width) direction, and an up-down (height or vertical) direction of the vehicle assembly 100. According to one aspect, the frame assembly includes a frame backing member 110 which extends in the width direction of the vehicle assembly 100 rearward of the vehicle seat 104 in the front-rear direction. The vehicle seat 104 generally includes a seat base (not shown) and a seat back 118 connected to the seat base. The seat back includes a seat back frame 120, and, optionally, a head rest 122 connected to the seat back frame. As is well known, a cushion (not shown) covers the seat back frame.

The frame backing member 110 is elongated along a length direction of the vehicle seat (i.e., the width direction of the vehicle assembly) and is substantially aligned with an upper portion of the seat back frame 120 relative to the height direction. The frame backing member 110 is further positioned separated from the vehicle seat 104 to define a space 130 between the vehicle seat 104 and the frame backing member 110 in the front-rear direction. An energy attenuating member 132 is positioned in the space 130 and is mounted in the space on at least one of the vehicle seat 104 and the frame backing member 110. In the depicted aspect, the energy attenuating member 132 spans between an upper portion of the seat back frame 120 and the frame backing member 110 in both the front-rear direction and the height direction, with a proximal end portion 136 connected to the upper portion of the seat back frame 120 and a distal end portion 138 connected to the frame backing member 110 (noting that the terms "proximal" and "distal" are relative to the front-rear direction). An interior panel 134 of the vehicle body is sized to cover the space 130 between the seat back frame 120 and the frame backing member 110.

Figure 2:
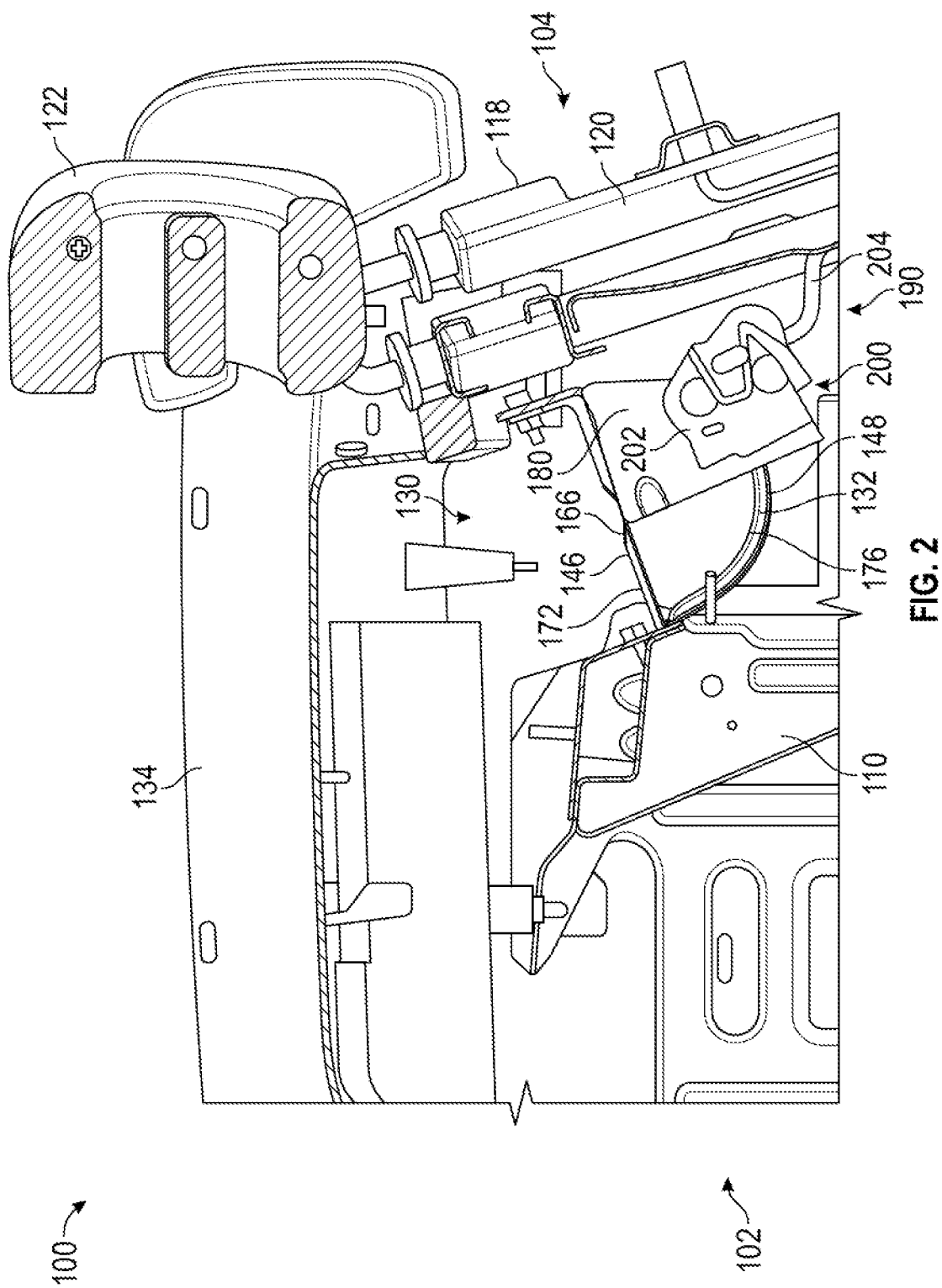
FIG. 2 is partial side view of the vehicle assembly showing an energy attenuating member attached to a seat back frame via a latch mechanism and to a frame backing member of a vehicle body.
Figure 3:
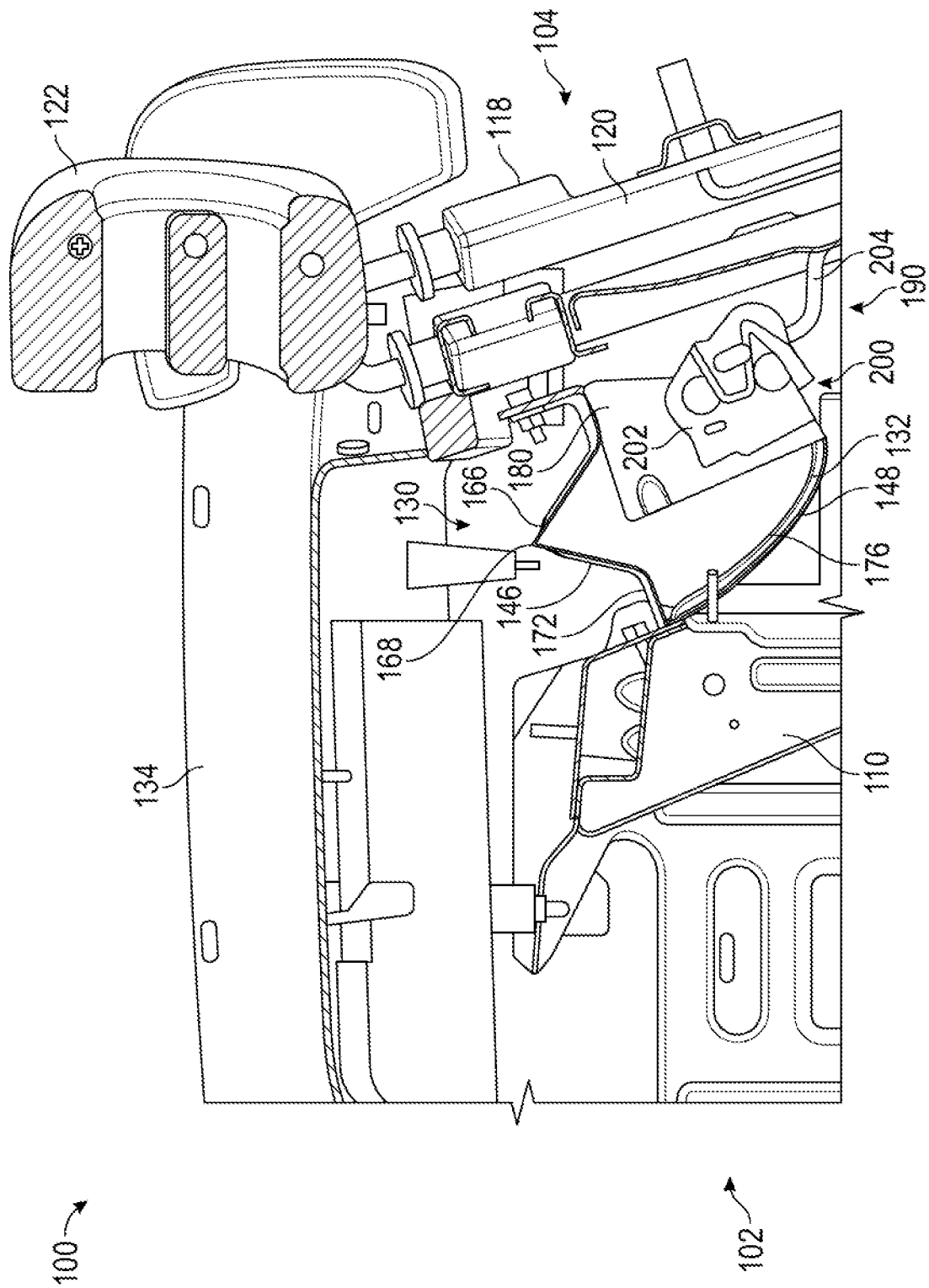
FIG. 3 is a partial side view showing the energy attenuating member of FIG. 2 in a collapsed state.

In the illustrated embodiment of FIGS. 2 and 3, the energy attenuating member 132 includes a first wall section 146 and a second wall section 148 extended across the space 130 and configured to collapse between the vehicle seat 104 and the frame backing member 110 during a crash event. The first wall section 146 extends across the space 130 between the seat back frame 120 and the frame backing member 110 to have a proximal end portion forming the proximal end portion 136 of the energy attenuating member 132, and to have a distal end portion forming the distal end portion 138 of the energy attenuating member 132. Similarly, the second wall section 148 extends across the space 130 between the seat back frame 120 and the frame backing member 110 to have a proximal end portion forming the proximal end portion 136 of the energy attenuating member 132, and to have a distal end portion forming the distal end portion 138 of the energy attenuating member 132. According to one aspect, the second wall section 148 extends around the first wall section 146 such that the first wall section 146 is interposed between and separates the proximal and distal end portions of the second wall section in the front-rear direction of the vehicle assembly 100.

Further, in a side view of the energy attenuating member 132 the second wall section 148 is bent around the first wall section 146 to have a substantially U-shaped profile. The second wall section 148 is secured beneath the first wall section 146 relative to the height direction of the vehicle assembly. In FIGS. 2 and 3, during a crash event the energy attenuating member 132 is configured to collapse between the seat back 118 and the frame backing member 110 to absorb kinetic energy in the vehicle seat 104 when the seat back 118 is driven toward the frame backing member 110. In this regard, a central portion 166 of the first wall section 146 is formed with a kink or bend 168 directed in a fold direction of the first wall section 146 when the energy attenuating member 132 collapses between the seat back 118 and the frame backing member 110. As shown, the kink or bend 168 is in height direction.

Therefore, when the energy attenuating member 132 collapses between the vehicle seat 104 and the frame backing member 110, a fold formed in the first wall section 146 is directed away from the second wall section 148. In addition, to ensure proper folding of energy attenuating member 132, the first wall section 146 can be formed with at least one first strengthening rib 172 extended between the proximal end portion 136 and the distal end portion 138 of the energy attenuating member 132. As shown, the first strengthening rib can be bifurcated by the kink or bend 168. The second wall section 148 can be formed with at least one second strengthening rib 176 extended continuously between the proximal end portion 136 and a distal end portion 138 of the energy attenuating member 132. However, it should be appreciated that the first wall section 146 may be configured to feature multiple kinks or bends and, in turn, multiple folds between the proximal and distal end portions of the first wall section 146 when the energy attenuating member 132 collapses between the vehicle seat 104 and the frame backing member 110 without departing from the scope of the present disclosure.

According to the present disclosure, a mounting bracket 180 separate from the vehicle seat 104 is provided to secure the energy attenuating member 132 to the seat back frame 120. The mounting bracket 180, which is positioned at and connected to the upper portion of the seat back frame 120, includes a body 182 with a first mounting part 184 and a second mounting part 186 extended from the first mounting part. The first mounting part 184 is adapted for connection to the upper portion of the seat back frame 120 (via a connection support portion 190 to be described hereafter), the second mounting part 186 is adapted for connection to the energy attenuating member 132, and the energy attenuating member 132 interconnects the mounting bracket 180 and the frame backing member 110. More particularly, in FIG. 1, the body 182 of the mounting bracket 180 is configured with the first mounting part 184 offset from the second mounting part 186 in a length direction of the mounting bracket (i.e., the width direction of the vehicle assembly 100). This positions the connection of the mounting bracket 180 to the seat back frame 120 inside of the connection of the mounting bracket 180 to the energy attenuating member 132. Further, in the depicted aspect of FIG. 1, the first mounting part 184 is offset from the second mounting part 186 in the front-rear direction which locates the first mounting part rearward of the second mounting part toward the frame backing member 110. To this end, a connecting part 192 of the body 182 interconnects the first and second mounting parts 184, 186. Gussets 194 can be provided at the interface of the connecting part 192 and the first mounting part 184 to provide strength and rigidity to the first mounting part 182. Additionally, in the depicted aspect the mounting bracket 180 is adapted for connection of two energy attenuating members 132 (i.e., first and second similarly shaped and constructed energy attenuating members 132). With this arrangement of the mounting bracket 180, a pair of second mounting parts 186 (i.e., the second mounting part and another second mounting part) are provided for the two energy attenuating members 132, with the first mounting part 184 spanning between and rearward (in the front-rear direction) of the second mounting parts 186 via a pair of connecting parts 192. The second mounting parts 186 constitute opposite end portions of the mounting bracket 180.

According to the present disclosure, the mounting bracket 180 is directly connected to the energy attenuating member 132 and indirectly connected to the seat back frame 120 via the connection support portion 190, which supports the upper portion of the seat back frame 120 at the frame backing member 110. In the depicted aspect, the connection support portion 190 includes a latch mechanism 200 having a first latch component 202 provided on the first mounting part 184 of the mounting bracket 180 and a second latch component 204 for connection with the first latch component provided on the seat back frame 118. The first latch component 202 is defined by one of a latch and a striker, and the second latch component 204 is defined by the other of the latch and the striker. As shown in FIGS. 1-3, the first latch component 202 is the latch and the second latch component 204 is the striker. The first mounting part 184 is adapted for connection to a mounting support or plate 210 of the latch. The striker 204 can be in the form of a substantially U-shaped wire secured by the seat back frame 120. As is known to one skilled in the art, the latch 202 generally includes a slot to receive the striker 204, a latch member to hold the striker into the slot, a lock member to lock the latch member at a holding position of the striker, and a lock releasing member to unlock the lock member. As the seat back 118 is moved from a folding state to a standing state, the striker 204 is received in the slot of the latch 202. The latch member is pushed by the striker 204 so as to move to its holding position, and the latch member is held by the lock member at its holding state. Thus, the striker 204 is held in the slot of the latch 202, so that the upper portion of the seat back frame 120 is connected to and supported at the frame backing member 110 via the energy attenuating members 132. Further, to prevent any interference with the energy attenuating member 132 during an impact event, as shown in FIGS. 1-3, the latch 202 is positioned beneath the first wall section 146 in the height direction of the vehicle assembly 100 and is located more toward the proximal end portion 136 than the distal end portion 138 of the energy attenuating member, and the striker 204 is curved upwardly in the height direction for engagement with the latch 202.

In the depicted embodiment, the energy attenuating member 132 is fastened to the frame backing member 110 and the second mounting part 186 of the mounting bracket via, for example, bolts. It should be appreciated that the bolted attachment of the energy attenuating member 132 prevents the proximal and distal end portions 136, 138 of the energy attenuating member 132 from rotating during an impact event as the energy attenuating member 132 is collapsed between the seat back 118 and the frame backing member 110.

It will be appreciated that the above-disclosed and other features and functions, or alternatives or varieties thereof, may be desirably combined into many other different systems or applications. It should further be appreciated that any term of degree used herein, such as "substantially," means a reasonable amount of deviation of the modified word is contemplated such that the end result is not significantly changed. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
a vehicle body including a frame backing member;
a vehicle seat including a seat back having a seat back frame;
an energy attenuating member positioned in a space between the frame backing member and the seat back frame in a front-rear direction of the vehicle assembly, one end portion of the energy attenuating member connected to the frame backing member;
a mounting bracket separate and distinct from the energy attenuating member and connected to an opposite end portion of the energy attenuating member; and
a connection support portion that is offset from the energy attenuating member in a width direction of the vehicle assembly and that releasably connects the mounting bracket to an upper portion of the seat back frame in a height direction of the vehicle assembly.

2. The vehicle assembly of claim 1, wherein during a crash event the energy attenuating member is configured to collapse between the seat back frame and the frame backing member to absorb kinetic energy in the vehicle seat when the seat back is driven toward the frame backing member.

3. The vehicle assembly of claim 1, wherein the connection support portion includes a latch mechanism having a first latch component provided on the mounting bracket and a second latch component for connection with the first latch component provided on the seat back frame.

4. The vehicle assembly of claim 3, wherein the first latch component is a latch and the second latch component is a striker.

5. The vehicle assembly of claim 3, wherein the mounting bracket includes a first mounting part and a second mounting part extended from the first mounting part, the first mounting part adapted for connection to the first latch component, the second mounting part adapted for connection to the energy attenuating member.

6. The vehicle assembly of claim 5, where in the front-rear direction the first mounting part is offset relative to the second mounting part toward the frame backing member.

7. The vehicle assembly of claim 5, wherein the energy attenuating member is a first energy attenuating member, and including a second energy attenuating member spaced from the energy attenuating member in the width direction of the vehicle assembly and connected to the frame backing member, and
the mounting bracket includes another second mounting part for connection to the second energy attenuating member.

8. The vehicle assembly of claim 7, where in the front-rear direction the first mounting part is offset relative to each of the second mounting part and the another second mounting part toward the frame backing member, and is positioned between the second mounting part and the another second mounting part in the width direction.

9. The vehicle assembly claim 3, wherein the energy attenuating member includes a first wall section and a separate second wall section secured to the first wall section, wherein in a side view of the energy attenuating member the second wall section is bent around the first wall section to have a U-shaped profile.

10. The vehicle assembly of claim 9, wherein the second wall section is secured beneath the first wall section relative to the height direction of the vehicle assembly.

11. The vehicle assembly of claim 9, wherein a central portion of the first wall section is formed with a kink or bend directed in a fold direction of the first wall section when the energy attenuating member collapses between the seat back frame and the frame backing member.

12. The vehicle assembly of claim 9, wherein the first latch component is positioned beneath the first wall section in the height direction of the vehicle assembly.

13. A vehicle assembly comprising:
a vehicle body including a frame backing member;
a seat having a seat back with a seat back frame, an upper portion of the seat back frame aligned with the frame backing member relative to a height direction of the vehicle assembly;
an energy attenuating member positioned in a space between the frame backing member and the seat back frame and connected to the frame backing member, wherein during a crash event the energy attenuating member is configured to collapse between the seat back frame and the frame backing member to absorb kinetic energy in the vehicle seat when the seat back is driven toward the frame backing member;
a mounting bracket separate and distinct from the energy attenuating member, the mounting bracket including a first mounting part and a second mounting part extended from the first mounting part in a width direction of the vehicle assembly, the second mounting part connected to the energy attenuating member; and
a connection support portion releasably connects the first mounting part of the mounting bracket to the upper portion of the seat back frame.

14. The vehicle assembly of claim 13, wherein the connection support portion includes a latch mechanism having a first latch component provided on the first mounting part of the mounting bracket and a second latch component for connection with the first latch component provided on the seat back frame.

15. The vehicle assembly of claim 14, wherein the first latch component is one of a latch and a striker and the second latch component is the other of the latch and the striker.

16. The vehicle assembly of claim 13, wherein the energy attenuating member is a first energy attenuating member, and including a second energy attenuating member spaced from the energy attenuating member in the width direction of the vehicle assembly and connected to the frame backing member, and the mounting bracket includes another second mounting part for connection to the second energy attenuating member.

17. The vehicle assembly of claim 16, where in the front-rear direction the first mounting part is offset relative to each of the second mounting part and the another second mounting part toward the frame backing member, and is positioned between the second mounting part and the another second mounting part in the width direction, wherein the second mounting part and the another second mounting part define opposite end portions of the mounting bracket.

18. The vehicle assembly of claim 13, wherein the energy attenuating member includes a first wall section and a second wall section separate from the first wall section and looped beneath the first wall section relative to the height direction of the vehicle assembly.

19. A vehicle assembly comprising:
a vehicle body including a frame backing member;
a vehicle seat including a seat back having a seat back frame;
a first energy attenuating member and a separate second energy attenuating member spaced from the first attenuating member in a width direction of the vehicle assembly, each of the first energy attenuating member and a second energy attenuating member positioned in a space between the frame backing member and the seat back frame in a front-rear direction of the vehicle assembly, the first energy attenuating member and a second energy attenuating member each connected to the frame backing member;
a mounting bracket connected to the first energy attenuating member and the second energy attenuating member; and
a connection support portion releasably connects the mounting bracket to an upper portion of the seat back frame in a height direction of the vehicle assembly,
wherein the connection support portion includes a latch mechanism having a first latch component provided on the mounting bracket between the first energy attenuating member and the second energy attenuating member and a second latch component for connection with the first latch component provided on the seat back frame.

20. The vehicle assembly of claim 19, wherein the first latch component is one of a latch and a striker and the second latch component is the other of the latch and the striker.

* * * * *